Figure 5:
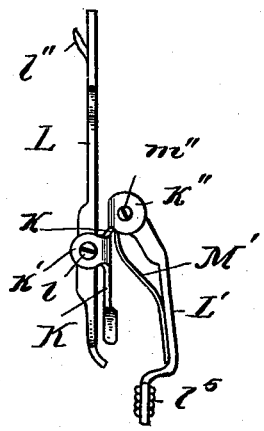

(No Model.) 2 Sheets—Sheet 1.
H. W. MARTIN.
FISHING REEL.
No. 594,411. Patented Nov. 30, 1897.
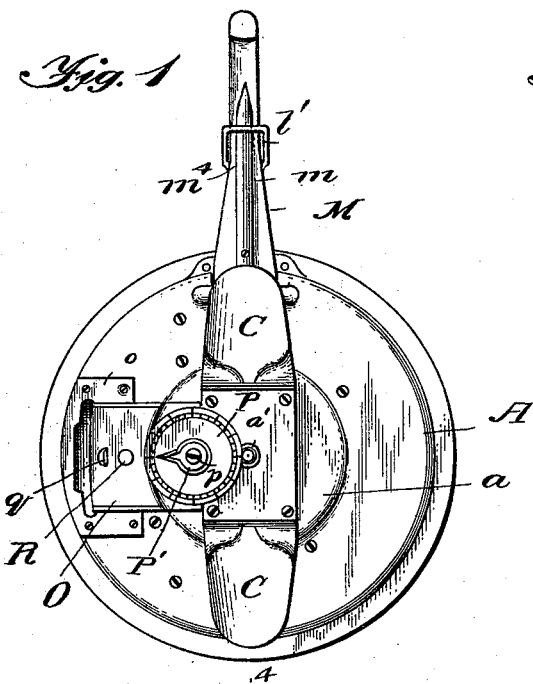
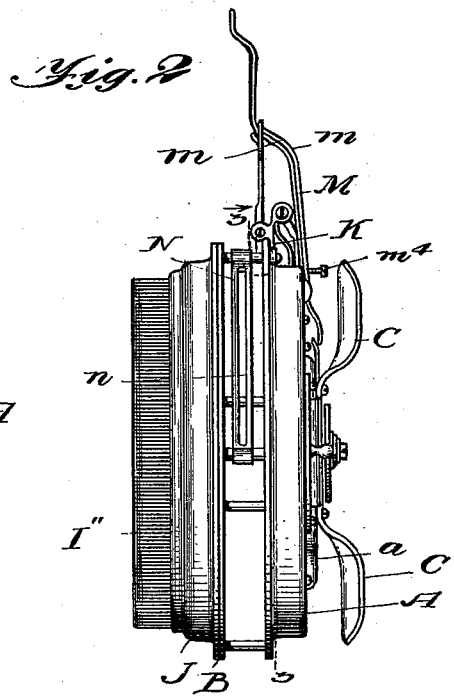
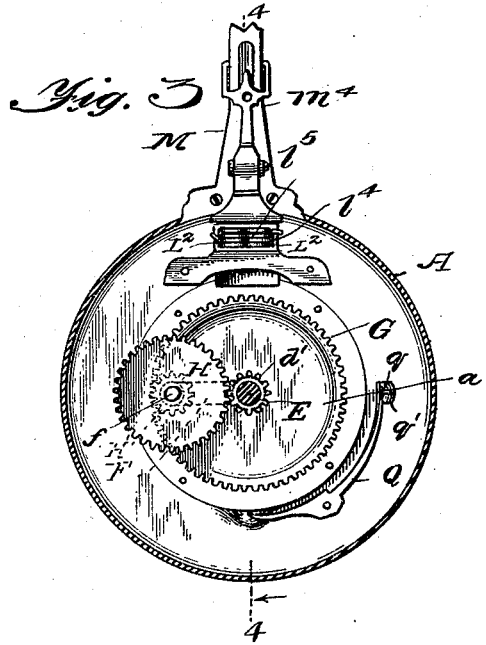
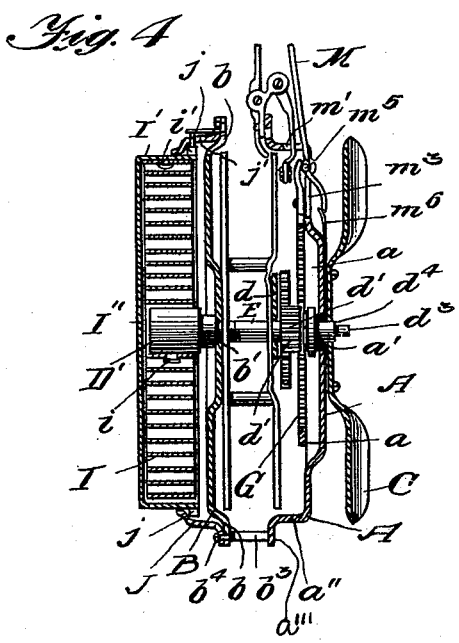
Witnesses
Inventor
Herman W. Martin
by Edson Bros
Attorneys (No Model.) 2 Sheets—Sheet 2.

H. W. MARTIN.
FISHING REEL.

No. 594,411. Patented Nov. 30, 1897.

Witnesses
Edmund A. Strauss
W. F. Berndorf

Inventor
Herman W. Martin
by Edson Bro's
Attorneys

UNITED STATES PATENT OFFICE.

HERMAN W. MARTIN, OF ILION, NEW YORK.

FISHING-REEL.

SPECIFICATION forming part of Letters Patent No. 594,411, dated November 30, 1897.

Application filed January 8, 1897. Serial No. 618,489. (No model.)

*To all whom it may concern:*

Be it known that I, HERMAN W. MARTIN, a citizen of the United States, residing at Ilion, in the county of Herkimer and State of New York, have invented certain new and useful Improvements in Fishing-Reels; and I do hereby declare the following to be a full, clear, and exact description of the invention, such as will enable others skilled in the art to which it appertains to make and use the same.

My invention relates to improvements in fishing-reels of the same general class as the line-reels disclosed by prior United States Letters Patent Nos. 479,440 and 551,550, granted to me on the 26th day of July, 1892, and 17th day of December, 1895, respectively.

One of the objects of my invention is to simplify the construction of the gearing appliances between the stationary housing and the revolving line-spool and enable me to employ a multiplying-gearing in connection with a revolving line-spool shaft or arbor, the latter of which furnishes the means for the operation of an indicator mechanism to enable the angler to advise himself of the length of the line paid out from the line-spool.

Another object that I have in view is to provide an improved guide to direct the line properly and insure its regular uniform winding on the line-spool, which guide lies compactly within the reel-housing and is out of the way of the angler in manipulating the reel and rod.

Another improvement which I have made is in the brake, which retards, arrests, and controls the line-spool, said brake having two jaws to clutch opposite faces of one head of the line-spool, one of said jaws having a friction-shoe, which when worn may be easily replaced.

Another object of my invention is to provide an improved indicator mechanism for operation in connection with the rotating line-spool shaft or arbor, which indicator mechanism is carried by a movable plate that is held under tension to press the indicator device into operative relation to the said shaft or arbor, but which plate may be easily moved by the angler away from the shaft or arbor, the indicator mechanism serving to automatically show to the angler the length of the fishing-line which has been paid out from the line-spool, which information is often of material aid to the angler.

With these ends in view my invention consists in the novel combination of devices and in the construction and arrangement of parts which will be hereinafter fully described and claimed.

To enable others to understand my invention, I have illustrated the preferred embodiment thereof in the accompanying drawings, forming a part of this specification, and in which—

Figure 6:
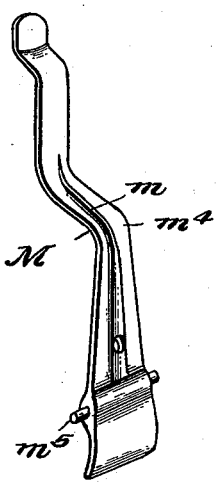
Figure 7:
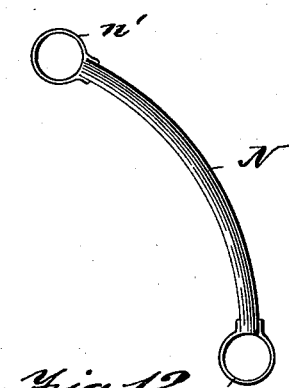
Figure 12:
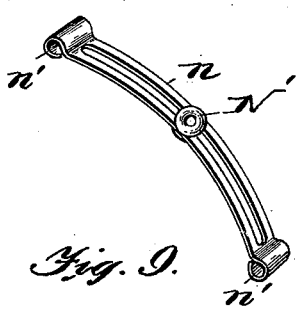
Figure 11:
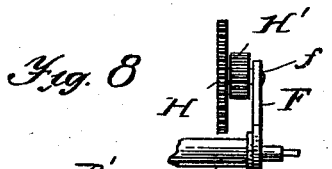
Figure 8:
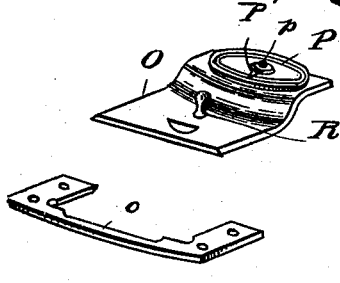
Figure 9:
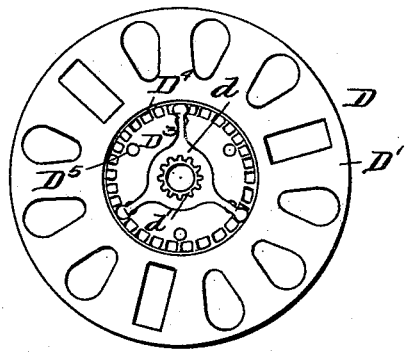
Figure 10:
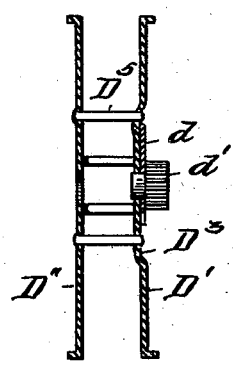

Figure 1 is an elevation looking at the side of the reel which is to be applied next to the fishing-pole, showing the line-indicator mechanism. Fig. 2 is an edge view, in elevation, of the reel. Fig. 3 is a vertical transverse section on the plane indicated by the dotted line 3 3 of Fig. 2, showing the transmitting multiplying-gearing between the spring-controlled rotating arbor or shaft and the revolving line-spool, also a part of the brake mechanism. Fig. 4 is a sectional view on a plane at right angles to Fig. 3 on the dotted line 4 4 of Fig. 3. Fig. 5 is an enlarged detail view of the two jaws of the brake. Fig. 6 is a view of the brake-controlling lever. Fig. 7 is a detail view of the idle line-guide. Fig. 8 is a detail perspective view of the carrier-plate and line-indicator thereon, also showing the keeper-guide for said carrier-plate. Figs. 9 and 10 are views in side elevation and cross-section of an improved type of line-spool. Fig. 11 is a detail view of the rotary arbor with crank-arm and compound gear. Fig. 12 is a modified form of the line-guide.

Like letters of reference denote corresponding parts in all the figures of the drawings, referring to which—

A B designate the two heads or plates which form the housing for the revolving line-spool and the frame for supporting the various operating parts of the improved reel. The head A, which is to be fitted next to the fishing-pole, has a central depression or cavity $a$, a bushing $a'$ for the protruding end of the line-spool arbor or shaft, an annular offstanding flange $a''$, and a radial annular flange $a'''$. The head B has an offstanding radial flange $b$, and at its center is an axial bushing $b'$, through which passes the end of the revolving line-spool shaft to which the mainspring is connected. These two plates are joined rigidly together by the transverse spacing-posts $b^3$ and the screws $b^4$, and the plates or heads thus occupy the same relation to each other at all times.

To the offstanding central part of the head or plate A, opposite to the cavity or depression $a$ therein, is fastened the external pole-attaching plate C, which is of the well-known form familiar to those skilled in the art, and through the central flat portion of said plate C extends the axial bushing $a'$ for the passage therethrough of the end of the revolving line-spool shaft that is designed to protrude beyond the reel-housing in order that said revolving shaft may operate in conjunction with the line-indicator mechanism.

The line-spool D may be similar in construction to the spool shown in my United States Patent No. 551,550. It consists of the parallel concentric disks joined together by devices which form the hub on which the fishing-line may be coiled, said disks having axially-alined hubs, one of which is prolonged to extend through a spider-like clutch $d$ and the gear-pinion $d'$, said clutch having radial elastic arms with their free extremities shaped to fit in an annular row of seats produced in the outer face of one of the spool-disks.

Through the alined hubs of the spool passes the revolving arbor or shaft E, which is long enough to have its ends project through the bushings $a'$ $b'$ of the two heads of the reel-housing. This shaft passes loosely through the line-spool hubs, so as to permit the latter to rotate freely on the shaft, and the shaft also passes loosely through the bushings $a'$ $b'$ to rotate freely therein. The end of the shaft that protrudes through bushing $b'$ in plate B is externally screw-threaded to enable the socketed and internally-threaded spring-attaching cap D' to be screwed thereon, and the other end of the rotary shaft or arbor is reduced to form an axial tenon $d^3$, forming an annular shoulder $d^4$, which abuts against the bushing $a'$ to limit the endwise movement of the shaft or arbor in one direction, said tenon $d^3$ extending through said bushing $a'$, so as to protrude therefrom a short distance, as shown by Fig. 4. To this rotary shaft or arbor, at a point between the line-spool D and the head A and housed within the latter, is fastened a rotary crank-arm F. This crank-arm is rigidly attached to the shaft or arbor to rotate therewith, and it is of a length sufficient to bring the small gear carried thereby into operative relation to the fixed annular rack G within the plate or head A of the reel-housing. This annular rack G is internally toothed, as shown, and it is fastened to the inner face or side of the plate or head A by screws or other suitable fastening means. The free end of the crank-arm F carries a crank-pin $f$, on which is loosely fitted the compound gear H H', consisting of two gear-wheels of different sizes rigidly attached together laterally. The crank-arm, pin, and compound gear are so arranged between the head A and line-spool as to enable the smaller gear H' to lie within the rack G and mesh with the teeth thereof, while the large member H of said compound gear meshes with the pinion $d'$ on the clutch of the line-spool. The described gearing, consisting of the fixed annular rack, the compound gear H H', and the pinion $d'$, together with the crank-arm and pin thereof, constitute the transmitting mechanism between the revolving arbor or shaft and the line-spool, whereby the power of the mainspring may be applied to the line-spool for rotating the latter to coil or wind up the fishing-line, and at the same time I am able to employ a rotating shaft or arbor, on which the line-spool is mounted for free rotation, and said shaft furnishes the motion or power for the operation of the line-indicator.

The spring-attaching cap D', which is rigidly fastened to the inner end of the shaft or arbor, is provided with a lip or stud $i$, which engages with the inner end of the helical mainspring I, the outer end of said spring having a loosely-connected link I' attached to a headed stud $i'$, which is fixed within the flanged drum I''. This drum incloses the mainspring, and it is provided with an annular ratchet $j$, that is fitted loosely within a flanged clamping-ring J, fastened to the plate or head B of the reel-housing, and on this clamping-ring is fastened one end of a spring-detent J', having a pawl-like lip that passes through a slot in the ring J to engage with the annular ratchet $j$ of the mainspring-drum, said detent being adapted to be thrown out of engagement with the drum-ratchet by a thumb-piece pivoted to the clamping-ring.

I will now proceed to describe in detail my improved brake mechanism, reference being had more especially to Figs. 3, 5, and 6 of the drawings.

K designates the jaw-supporting plate, which is fitted laterally against the outside face of the radial flange of the head A and secured thereto by screws or in any other suitable way. This plate has a stem or arm $k$, that extends beyond the flanged edge of the head, and said stem has two pairs of ears $k'$ $k''$, one of which pairs of ears $k'$ is situated at an intermediate point of the length of the stem and arranged to project across the radial flange of the head A; but the other pair of ears $k''$ is at the extremity of the arm and projects therefrom to the opposite side from the ears $k'$.

Two brake-jaws are provided in my improved brake mechanism for the purpose of gripping opposite faces of one head of the line-spool, and both of these jaws are fulcrumed on the plate K in a manner to move in opposite directions under the influence of a single controlling-lever. The jaws are indicated at L L' and the lever at M. One jaw L has its shank fitted between the ears $k'$, and it is fulcrumed at an intermediate point of its length by the pin or bolt $l$, the inner working end of the jaw being quite broad and nearly flat to form an efficient working surface to engage with the line-spool head. This jaw L is somewhat longer than the companion jaw L', and its long arm is operatively connected to the brake-lever by a loose joint—as, for example, by slotting, as at $l'$, an enlarged outer end of the shank and by forming a tongue $l''$ thereon, said slot $l'$ receiving the brake-lever and the tongue $l'''$, fitting in a depression or channel $m$ in the brake-lever. This loose connection between the jaw and brake-lever is sufficient, however, to make the lever control the jaw. The other short jaw passes through a slot $m'$ in the offstanding flange of the head A, and the shank of said lever has its extremity pivoted at $m''$ between the ears $k''$ on the fixed plate K, a pressure-spring M' having one end fastened to said jaw L' and bearing against the plate K to normally press the jaw L' away from the jaw L. This short jaw L' has its head formed with slots $l^4$, two, three, or more in number, and through these slots is threaded the cord $l^5$, which is arranged to form the friction-pads $L^2$, that provide an efficient shoe for the brake-jaw when it grips the head of the revolving line-spool. When the pad becomes worn or inefficient, the cord may be easily withdrawn from the slotted head of the jaw and a new cord threaded therein to provide a new friction-surface. The brake-lever M is arranged laterally against the head A, opposite to a slot $m^3$ therein and closely adjacent to the short brake-jaw L', said lever being curved or bent at $m^4$, so as to overhang the line-spool and permit the slotted and tongued end of the long brake-jaw to be connected therewith. The lever M carries a set-screw $m^8$, which presses against the short jaw L' and normally holds the latter in engagement with the line-spool and serves to regulate the tension of the spring M'. This brake-lever is fulcrumed at a point intermediate of its length on a pin or shaft $m^5$, and against the short arm of said lever works a leaf-spring $m^6$, which is held between the head A and the reel-attaching plate. The springs $m^6$ M' control the brake-lever and short brake-jaw, so that the jaws L L' may be pressed firmly against opposite sides of the head of the line-spool, and thus the brake is normally applied to hold the line-spool stationary even when the spool is under the tension of the mainspring. To release the brake and allow the mainspring to rotate the spool in a direction to coil or wind the line on said spool, it is only necessary for the angler to press the brake-lever in one direction, thus moving the long brake-jaw L on its fulcrum and releasing the screw $m^8$ from the jaw L' to permit the spring M' to force the jaw L' and its friction-shoe away from the line-spool, whereby the two jaws are freed from the line-spool on a single motion of the brake-lever. The jaws are instantly and forcibly applied against the line-spool when pressure on the brake-lever is removed, because the spring $m^6$ presses the lever M to force the jaw L against one side of the spool, and the screw $m^8$ bears against the jaw L' to press the latter and shoe against the other face of the line-spool.

The line-guide which I employ is indicated at N in the drawings, and it consists of a segment-shaped length of metal arranged to fit between the heads A B of the reel-housing and supported loosely in place to play or move idly and freely across the line-spool in a direction according to the pull or strain on the fishing-line. This segmental guide is of a length to extend from one post to the other of the series of posts which rigidly join the heads A B together, and said guide is provided with a longitudinal line-slot $n$, and at its ends it has eyes $n'$, which fit loosely upon two adjacent posts to support the guide N between the heads of the reel-housing. This guide is arranged concentric with the heads and is thus compactly arranged between them, so as to be wholly out of the way. The width of the guide is less than the space between the heads, and as the guide is loosely supported on the parts it can play idly across the line-spool in a manner to guide the line to be wound evenly on the line-spool.

It frequently occurs that the angler desires to know the length of the line that is paid out from the reel; but so far as I am aware fishing-reels have not heretofore been equipped with means to indicate the length of line that has been uncoiled from the reel, so that the angler has been compelled to guess merely as to the amount of line he has in service. It is one object of my invention to provide a simple novel form of line-indicator adapted for service in connection with the revolving shaft or arbor of the line-spool and arranged to be drawn into and out of service very easily and quickly. To this end I provide a carrier-plate O on the outside of the head A of the reel, and on this carrier-plate is mounted the line-indicator arranged to be operatively connected frictionally with the protruding end of the rotary line-spool shaft. This carrier-plate is shaped to closely embrace the head A, and it is fitted in a keeper $o$, which is fastened to the head, so that the carrier-plate may slide easily on the head A and within the keeper $o$. One form of the indicator which I contemplate using is a rotary disk P and a fixed hand or pointer P', attached to a pin $p$, which is fixed in the carrier-plate O and passes loosely through the disk P to serve as a center therefor. The exposed face of this rotary disk is inscribed with one, two, or more concentric circles which are subdivided by indicator marks and numerals to denote the length of line in feet or yards. The indicator mechanism is mounted on the carrier-plate to have the edge of the disk P project therefrom into operative relation to the protruding end of the revolving shaft or arbor, and the periphery of said disk P is held in frictional engagement with the revolving shaft by a pressure-spring Q, which is fastened inside of the head A and has one end thereof formed with a lug $q$, that passes through a slot $q'$ in the head A, said lug $q'$ being connected with the carrier-plate O, so as to force the latter and the indicator-disk normally toward the exposed end of the line-spool shaft. It is evident that the rotary line-spool will rotate the indicator-disk P, which engages frictionally therewith, and thus the pointer will indicate the length of line that has been paid out; but when it is desired to free the indicator from the revolving shaft it is only necessary for the angler to press on the thumb or finger piece R, which is fastened to the carrier-plate, thus moving the carrier-plate against the tension of the spring Q to withdraw the indicator-disk from engagement with the revolving line-spool shaft.

It is thought that the operation of my improvements will be readily understood from the foregoing description taken in connection with the drawings.

I have illustrated a cheap and simple form of the line-spool in Figs. 9 and 10 of the drawings. One of the disks D′ is a plain flat piece with a flanged edge and a circular row of perforations near its center, and the other disk D″ is a flat piece also having a flanged edge and a circular edge and a circular row of perforations, said last-named disk D′, provided with a circular cavity $D^3$, which is formed therein, and with a circular series of indentations $D^4$, which form the seats for the clutch. The two disks are joined together by a circular row of pins $D^5$, which are made separate from the disks and which have their ends fitted in the rows of perforations in the disks and swaged or headed down to rigidly couple the disks and form a hub on which the line may be coiled or wound.

In connection with the slotted line-guide N, which plays loosely on the real housing or frame in a direction across the face of the line-spool, I employ an eye-formed button N′, which is fitted loosely in the slot $n$ of the guide N and is adapted to move longitudinally on said slotted guide N. This embodiment of my invention is illustrated by Fig. 11 of the drawings. It is evident that this eye-formed button is capable of a compound or universal movement relative to the line-spool, because it moves with the guide N in a direction across the face of the line-spool. It is free to move around the line-spool within the limits of the slot $n$ in the guide N, and it is so fitted in the guide N that it can turn or rotate freely therein, whereby the line which passes through the eye of the button is held from chafing and wear and is guided to wind properly on the spool. The button is of disk-like form, of a suitable hard smooth material, and through it is formed an eye or perforation with rounded or beveled ends. In the edge of the button is formed an annular groove that receives the edges of the guide N to enable the button to fit loosely in the guide, so as to turn freely therein.

Having thus fully described my invention, what I claim as new, and desire to secure by Letters Patent, is—

1. In a fishing-reel, the combination with a reel-housing, and a mainspring, of a revolving line-spool shaft or arbor journaled in said housing and operatively connected with said mainspring, a line-spool mounted loosely on said revolving arbor or shaft, multiplying-gearing and clutch mechanism intermediate between the revolving shaft or arbor and the line-spool loosely mounted thereon and a line-indicator mechanism arranged laterally on the reel-housing and in operative relation to said revolving line-spool to be driven thereby, substantially as and for the purposes described.

2. In a fishing-reel the combination with a reel-housing and a mainspring, of a single revolving arbor or shaft having one end operatively connected with said mainspring and extended, at its other end, beyond the reel-housing, a line-spool mounted loosely on said shaft or arbor, a fixed gear or rack in the reel-housing adjacent to the free end of said shaft or arbor, a rotary crank attached to the arbor or shaft and carrying gears which mesh with said fixed gear or rack and with a gear on the line-spool, and a line-indicator mechanism supported externally on the reel-housing and having a driven wheel operatively connected with the exposed or projecting end of the revolving arbor or shaft, as and for the purposes described.

3. In a fishing-reel, the combination with a reel-housing and a mainspring, of the revolving shaft or arbor, a line-spool mounted loosely thereon, an internal gear or rack fixed in the reel-housing, a clutch connected with the line-spool and carrying a gear-pinion, a crank-arm attached to the shaft or arbor to rotate therewith, and a compound gear which meshes with the fixed internal gear and with the clutch-pinion, respectively, as and for the purposes described.

4. The combination with a reel-housing and a rotatable line-spool, of brake mechanism comprising a pair of oppositely-movable jaws hung to embrace opposite faces of said line-spool and a single controlling-lever arranged in operative relation to both jaws of said brake device, as and for the purposes described.

5. The combination with a reel-housing and a line-spool, of a pair of brake-jaws fulcrumed to move in opposite directions simultaneously and arranged to embrace opposite faces of said line-spool, and a spring-controlled brake-lever, one of said jaws being impelled in one direction by a spring and moved in the opposite direction by said brake-lever, and the other jaw being connected with said brake-lever to move therewith, as and for the purposes described.

6. The combination with a reel-housing and a line-spool, of a brake-supporting device attached to said housing, a spring-controlled brake-jaw pivoted to said supporting device, a brake-lever fulcrumed on the housing and arranged to act on the spring-jaw against the tension of its spring, and another brake-jaw also pivoted on the supporting device and operatively connected with the brake-lever, substantially as described.

7. The combination with a reel-housing and a line-spool, of a supporting-plate, a brake-jaw pivoted to said plate and carrying a spring which normally impels it upon the line-spool, another brake-jaw hung at a point intermediate of its length on said plate and having a slotted end, and a spring-pressed brake-lever fitted in the slotted end of one brake-jaw and carrying a projection to bear upon the other jaw, as and for the purposes described.

8. In a fishing-reel, a brake-jaw having a perforated or slotted working face and a friction-pad formed by threading a fibrous material through said slotted or perforated face of the jaw, as described.

9. In a fishing-reel, the combination with a reel-housing and a line-spool, of an idle line-guide, segmental in form, which is loosely supported between and substantially concentric with the heads of the reel-housing and provided with a slot or eye for the passage of the line therethrough, said line-guide being capable of movement freely in the plane across the face of the line-spool, substantially as described.

10. In a fishing-reel, the combination with disk-like heads coupled by transverse posts to form a reel-housing, and a line-spool, of a segmental guide having its ends fitted loosely on adjacent posts and arranged concentric with, and between, the disk-like heads to play idly on said posts in a plane across the face of the line-spool, for the purposes described, substantially as set forth.

11. The combination with a reel-housing and a line-spool, of a revolving arbor or shaft on which the line-spool is mounted, and a line-indicator mechanism mounted on said reel-housing and having a smooth wheel which frictionally engages with the revolving arbor or shaft to be driven thereby, as and for the purposes described.

12. The combination with a reel-housing and a line-spool, of a revolving line-spool shaft or arbor, a movable carrier on said reel-housing, and a line-indicator device mounted on said carrier and arranged to have frictional engagement with said revolving shaft or arbor, substantially as described.

13. In a fishing-reel, the combination with a reel-housing and a line-spool, of a revolving shaft or arbor on which a line-spool is mounted, a slidable spring-controlled carrier fitted to said reel-housing, and an indicator mechanism mounted on said carrier and pressed or held thereby into operative contact with said revolving shaft or arbor, substantially as described.

14. The combination of a revolving arbor or shaft, a fixed keeper or slideway, a carrier-plate fitted in said keeper or slideway, a spring acting on said carrier-plate to normally impel it toward said shaft or arbor, and an indicator mechanism mounted on the carrier-plate, as and for the purposes described.

15. The combination with a reel-housing and a line-spool, of a line-guide arranged concentric to the line-spool and movable across the face of the same, and a button carried by said guide and movable longitudinally thereon in an arc of a circle concentric with the line-spool, substantially as described.

16. The combination with a reel-housing and a line-spool, of a slotted line-guide fitted loosely on said housing to play freely across the face of the line-spool, and an eye-formed button mounted loosely in said slotted line-guide, as and for the purposes described.

In testimony whereof I affix my signature in presence of two witnesses.

HERMAN W. MARTIN.

Witnesses:
E. B. MAURICE,
CHAS. E. MAURICE.